Aug. 28, 1934.  S. ZIMMER ET AL  1,971,364
SELF HEATING CONSERVE
Filed Aug. 17, 1933

INVENTORS
SEBASTIAN ZIMMER
STANLEY KOPLINKA
BY
ATTORNEY

Patented Aug. 28, 1934

1,971,364

UNITED STATES PATENT OFFICE 1,971,364

SELF-HEATING CONSERVE

Sebastian Zimmer and Stanley Koplinka,
Locust Valley, N. Y.

Application August 17, 1933, Serial No. 685,592

15 Claims. (Cl. 126—263)

This invention relates to new and useful improvements in a self heating conserve.

The invention has for an object the construction of an article as mentioned which is characterized by the arrangement of a container for food and the like, a container for unslaked lime and the like in the vicinity of said container to heat the food upon the addition of a fluid to the lime to create the heat. Particularly the invention relates to a novel arrangement for controlling the fluid to distribute upon the unslaked lime.

Still further the invention proposes the arrangement of a container for water in the top portion of the lime holding container previously mentioned and having several partitions dividing off several separate compartments for holding the water, to permit the functioning of the compartments selectively and so control the discharge of water upon the lime.

Furthermore the invention proposes arranging a member beneath the water holding container for covering the unslaked lime and a provision whereby the discharge from any one of the compartments previously mentioned is distributed over various portions of the lime.

Furthermore the invention also proposes arranging the parts in a manner so that the food container is partially engaged into the unslaked lime container, and the water container arranged immediately above the lime container.

Furthermore the invention also proposes an arrangement whereby the lime container is arranged within the food container, and the water container is disposed over the lime container.

Still further the invention proposes an arrangement whereby the water container may be readily punctured with a tool such as an ice pick to cause the discharge of water upon the lime.

As another object of this invention it is proposed to construct a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
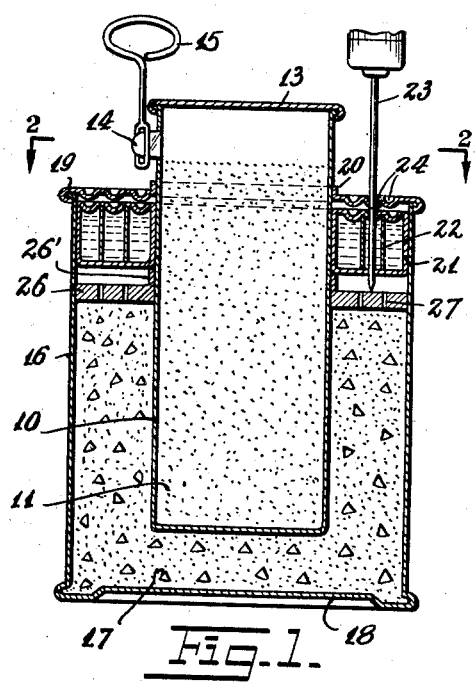
Fig. 1 is a vertical sectional view of a device constructed according to this invention.
Figure 2:
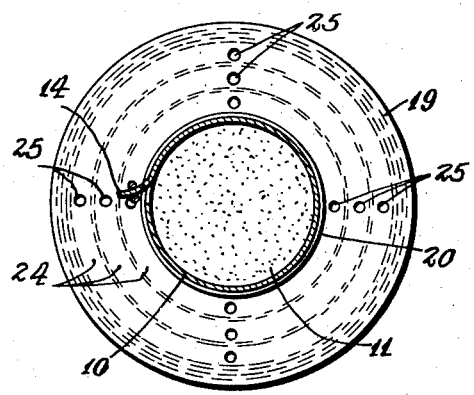
Fig. 2 is a horizontal sectional view taken on the line 2—2 of Fig. 1.

The self heating conserve according to this invention comprises a container 10 for food 11 hermetically sealed or stored or held in any other manner according to known practices. In detail the container is shown with a top cover 13 secured in place. Provision is made whereby the container may be opened so that food may be removed. This provision is shown to comprise a tongue 14 projecting from the side of the container and adapted to be engaged by a turning key 15 so that the material of the container may be turned open to expose the food.

The food container is associated with another container 16 for unslaked lime 17 or other similar chemicals and is arranged within the vicinity of the food container 10 to heat the food upon the addition of a proper fluid to the unslaked lime to create heat. The container 16 is shown provided with a bottom 18 permanently secured in place and a top 19 also permanently secured in place but arranged with an opening surrounded by a flange 20. The food container 10 extends to the opening and is in intimate contact with the flange 20 so as to be frictionally supported. The unslaked lime 17 surrounds the lower end of the food container 10. A water holding container 21 is disposed in the top portion of the lime container 16 and has several partitions 22 dividing off several water holding compartments. The container 21 is of annular form having an inside opening adapted to snugly engage against the outside of the food container 10. The outer side of the water container 21 is arranged in intimate contact with the inner wall of the container 16. The partitions 21 are shown of annular form dividing off annular compartments for the water.

The top 19 of the unslaked lime container and the water holding container 21 are formed of material readily puncturable with a tool such as the ice pick 23. To facilitate puncturing the top 19 and the top side of the water container 21 are formed with annular grooves 24 and at certain portions of these grooves there are superimposed niches or depressions 25. The arrangement is such that the ice pick may be engaged in any of the niches 25 and forced downwards to puncture the top 19 and the water container. The concentric grooves 24 are arranged so as to indicate the location of the various compartments of the water container. With this arrangement it is possible for example to puncture the outer water compartment, or the central water compartment, or any other water compartment as desired.

A member 26 is arranged beneath the water holding compartment 21 and covers the unslaked lime 16 and is of material which is not puncturable with an ice pick or similar to it. This member 26 is in the form of a disc having a spacing flange 26' and a central opening for the food container 10 to project through, and having its outer diameter in intimate contact with the inner wall of the unslaked lime container 16. The member 26 is formed with a plurality of small passages 27 arranged at various places and are much smaller than the opening which will be produced by the ice pick 23 when the water compartments are punctured. The arrangement is such that the liquids from the water compartments will run over the upper face of the member 26 and then leak through the openings 27 and so be distributed at various points upon the unslaked lime to produce heat at various points around the food container. This arrangement is important in that it overcomes the undesirable features of all the water concentrating at one side and causing uneven heating of the food.

Figure 3:
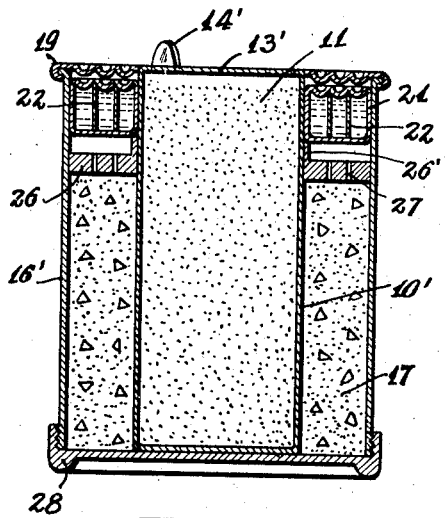
Fig. 3 is a view similar to Fig. 1 but illustrating a modified arrangement.

In Fig. 3 another embodiment of the same invention has been disclosed which is very similar to the form just described except for the fact that the unslaked lime container 16' is provided with a removable bottom 28 which is threadedly engaged in place. With this arrangement it is possible to conveniently remove or add unslaked lime as is deemed necessary. Still further the arrangement permits the removal of the member 26 and the water container 21 which parts may be replaced in conditions as desired.

For example, should the water container be completely used, a new container may be substituted. In this manner the unslaked lime container and other parts may be used several times to heat the same or different cans or containers of food. In this form, the food container 10' is opened by tong 14', provided at the top face 13' which is flush with the top lime container 16'. In other respects this form is similar to the preferred form, and corresponding parts may be recognized by the same reference numerals.

Figure 4:
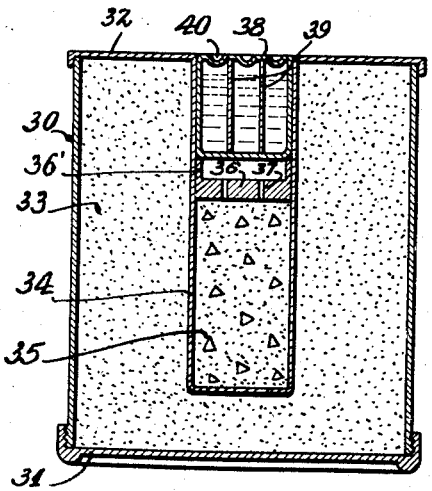
Fig. 4 is another view similar to Fig. 1 but illustrating a still further embodiment of the invention.

In Fig. 4 another embodiment of the invention has been disclosed which is very similar to the preferred form except for the fact that according to this form the lime container is arranged within the food container as distinguished from the previous form wherein the food container was disposed within the lime container. According to this form a food container 30 is provided with a removable bottom 31. This bottom may be hermetically sealed with fusible metals or in any other arrangement for protecting food according to known processes.

The container 30 has a top cover 32 permanently attached so that the food 33 within the container is safely stored. Another container 34 for unslaked lime or the like is arranged within the container 30 and more particularly is shown connected with and integral with the top cover 31. Within the container 34 the unslaked lime 35 is placed. A member 36 is disposed upon the top of the unslaked lime and is formed with a spacing flange 36' and several small passages 37 for the water to reach the lime. A water container 38 is disposed in the upper portion of the unslaked lime container 38 and is arranged with several partitions 39 to divide off several water compartments. The water holding container 38 is spaced slightly above the member 36 by flange 36'.

The top surface of the water holding container is formed with other depressions 40 to guide and help the puncturing of the water container with an ice pick such as 26 previously described. With the present arrangement the ice pick may be punctured through to cause any of the compartments of the water holding container to discharge its water upon the member 26. This water will spread over the member and seep through the openings 37 and so reach the unslaked lime for causing chemical reaction and the production of heat to heat the food in the food container.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by United States Letters Patent is:—

1. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime.

2. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like and a member beneath said water holding container and covering said unslaked lime and being of material not puncturable with an ice pick and having a plurality of small passages at various places for distributing the water of any punctured compartment of said water container upon said unslaked lime, said container for food being arranged partially within the container for the unslaked lime.

3. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment, of said water container upon said unslaked lime, said container for the unslaked lime being provided with a top having an opening, and said food container extending through said opening to be partially submerged in the unslaked lime.

4. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like and a member beneath said water holding container and covering said unslaked lime and being of material not puncturable with an ice pick and having a plurality of small passages at various places for distributing the water of any punctured compartment of said water container upon said unslaked lime, said container for the unslaked lime being provided with a top having an opening and said food container extending through said opening to be partially submerged in the unslaked lime, and said water container being in the form of an annular container surrounding said food container and disposed within the upper portion of said container holding the unslaked lime.

5. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said container for the unslaked lime being provided with a top having an opening, and said food container extending through said opening to be partially submerged in the unslaked lime, and said water container being in the form of an annular container surrounding said food container and disposed within the upper portion of said container holding the unslaked lime, said water holding container being slightly spaced from the top of the container holding the unslaked lime.

6. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said container for the unslaked lime being provided with a top having an opening, and said food container extending through said opening to be partially submerged in the unslaked lime, and said water container being in the form of an annular container surrounding said food container and disposed within the upper portion of said container holding the unslaked lime, said water holding container being slightly spaced from the top of the container holding the unslaked lime, and grooves and niches upon the top of the unslaked lime container and the water container for guiding and facilitating the puncturing of the water container with an ice pick or the like.

7. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said container for the unslaked lime being provided with a top having an opening, and said food container extending through said opening to be partially submerged in the unslaked lime, and said water container being in the form of an annular container surrounding said food container and disposed within the upper portion of said container holding the unslaked lime, said water holding container being slightly spaced from the top of the container holding the unslaked lime, and grooves and niches upon the top of the unslaked lime container and the water container for guiding and facilitating the puncturing of the water container with an ice pick or the like, said grooves and niches serving as indication marks to distinguish the other water compartments.

8. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said container for the unslaked lime being provided with a top having an opening, and said food container extending through said opening to be partially submerged in the unslaked lime, and said water container being in the form of an annular container surrounding said food container and disposed within the upper portion of said container holding the unslaked lime, said water holding container being slightly spaced from the top of the container holding the unslaked lime, said member constituting a disc encircling said food container and having its peripheral edge in intimate engagement with the side walls of said container holding the unslaked lime.

9. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, the container for the unslaked lime having a removable part for permitting access to the interior to remove or replace unslaked lime.

10. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water or any punctured compartment of said water container upon said unslaked lime, the container for the unslaked lime having a removable part for permitting access to the interior to remove or replace unslaked lime, said removable part comprising the entire bottom which threadedly engages in place, allowing also the removal of other elements within the container.

11. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said unslaked lime container being disposed within said food container.

12. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a member beneath said water holding container and covering said unslaked lime and being of material not puncturable with an ice pick and having a plurality of small passages at various places for distributing the water of any punctured compartment of said water container upon said unslaked lime, said container holding the food extending into said container holding the unslaked lime, and said container for the water being of annular shape arranged around the container for the food, and said partitions in the water container being also of annular shape dividing off annular shaped compartments as previously recited for the water.

13. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a perforated element between said water container and unslaked lime container for controlling the passage of water from the water container to the unslaked lime container.

14. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a perforated element between said water container and unslaked lime container for controlling the passage of water from the water container to the unslaked lime container, said containers for food and for the unslaked lime being cylindrical and co-axially arranged with said element to form a single unit.

15. In a self heating conserve, a container for food and the like, a container for unslaked lime and the like in the vicinity of said food container to heat said food upon the addition of fluid to the unslaked lime to create heat, a container for water in the top portion of said unslaked lime holding container and having partitions dividing off several separate water holding compartments, said water holding container being of material readily puncturable with an ice pick or the like, and a perforated element between said water container and unslaked lime container for controlling the passage of water from the water container to the unslaked lime container, said container for food and for the unslaked lime being cylindrical and co-axially arranged with said element to form a single unit, the upper faces of both of said containers being flush, and said element being spaced from the bottom of said water container.

SEBASTIAN ZIMMER.
STANLEY KOPLINKA.